United States Patent
Nishiguchi et al.

(10) Patent No.: US 8,729,196 B2
(45) Date of Patent: May 20, 2014

(54) CATIONIC ELECTRODEPOSITION PAINT COMPOSITIONS

(75) Inventors: Shigeo Nishiguchi, Hiratsuka (JP); Akihiko Shimasaki, Hiratsuka (JP)

(73) Assignee: Kansai Paint Co., Ltd., Hyogo-Ken (JP)

( * ) Notice: Subject to any disclaimer, the term of this patent is extended or adjusted under 35 U.S.C. 154(b) by 402 days.

(21) Appl. No.: 12/230,316

(22) Filed: Aug. 27, 2008

(65) Prior Publication Data

US 2009/0069510 A1 Mar. 12, 2009

(30) Foreign Application Priority Data

Sep. 11, 2007 (JP) ................. 2007-235417

(51) Int. Cl.
| | |
|---|---|
| C08L 61/06 | (2006.01) |
| C08L 63/00 | (2006.01) |
| C08G 8/28 | (2006.01) |
| C08L 61/00 | (2006.01) |
| C08G 59/14 | (2006.01) |
| C08F 283/10 | (2006.01) |
| C08G 65/48 | (2006.01) |
| C08F 283/00 | (2006.01) |

(52) U.S. Cl.
USPC ........... 525/486; 525/490; 525/504; 525/510; 525/526; 525/528; 525/534; 525/540

(58) Field of Classification Search
USPC .......................................... 525/526
See application file for complete search history.

(56) References Cited

U.S. PATENT DOCUMENTS

| | | |
|---|---|---|
| 4,698,141 A | 10/1987 | Anderson et al. |
| 4,867,854 A | 9/1989 | McIntyre |
| 4,868,230 A | 9/1989 | Rao et al. |
| 4,883,830 A * | 11/1989 | Kitabatake et al. ........... 204/502 |
| 6,342,546 B1 | 1/2002 | Kato et al. |
| 2005/0215670 A1* | 9/2005 | Shimasaki et al. ............ 523/451 |
| 2005/0256229 A1 | 11/2005 | Shimasaki et al. |

FOREIGN PATENT DOCUMENTS

| | | |
|---|---|---|
| JP | 63-92637 | 4/1988 |
| JP | 8-245750 | 9/1996 |
| JP | 2001-3005 | 1/2001 |
| JP | 2003-221547 | 8/2003 |
| JP | 2006-274234 | 10/2006 |

* cited by examiner

Primary Examiner — Peter F Godenschwager
Assistant Examiner — David Karst
(74) Attorney, Agent, or Firm — Wenderoth, Lind & Ponack, L.L.P.

(57) ABSTRACT

This invention discloses cationic electrodeposition paint compositions which comprise specific amino group-containing modified epoxy resin, specific xylene-formaldehyde resin-modified, amino group-containing epoxy resin and blocked polyisocyanate curing agent at specific blend ratios, and which can form coating film of excellent film thickness retention, finished appearance and electrocoatability on galvanized alloy steel sheet and of good corrosion resistance, even when the amount of volatile organic compound in the cationic electrodeposition paint is reduced.

10 Claims, No Drawings

CATIONIC ELECTRODEPOSITION PAINT COMPOSITIONS

TECHNICAL FIELD

This invention relates to cationic electrodeposition paint compositions excelling in water dispersibility which contain as the resin component amino group-containing modified epoxy resin (A), xylene-formaldehyde resin-modified amino group-containing epoxy resin (B) and blocked polyisocyanate curing agent (C). In particular, the invention relates to cationic electrodeposition paint compositions which, even when the quantity of volatile organic compound in cationic electrodeposition paint is reduced, still exhibit excellent film thickness retention, finished appearance and electrocoatability on galvanized alloy steel sheet, and can form coating film of good corrosion resistance.

BACKGROUND ART

Cationic electrodeposition paint compositions excel in coating workability, and films formed thereof exhibit good corrosion resistance. Hence they are widely used as undercoat of electrically conductive metallic articles such as car bodies which require these properties.

Resins which are used in cationic electrodeposition paint compositions normally are produced using organic solvent, and are blended with the paint in the form of organic solvent-containing resin solutions (varnishes). Resulting cationic electrodeposition paint compositions, therefore, contain organic solvent.

Cationic electrodeposition paint compositions containing organic solvent show such technical effects as good hydrophilicity/hydrophobicity balance leading to high paint stability without degradation in water dispersibility of the resins which are the constituent component of the cationic electrodeposition paint compositions; good film thickness retention with time and finished appearance of the coating film; and excellent electrocoatability on galvanized alloy steel sheet. Heretofore such organic solvent as ethylene glycol monobutyl ether (boiling point, 171° C.), ethylene glycol monohexyl ether (boiling point, 208° C.), propylene glycol monopropyl ether (boiling point, 150° C.), cyclohexanone (boiling point, 145° C.) and the like have been used for cationic electrodeposition paint compositions.

Use of these organic solvents is restricted in recent years for consideration of environments, by volatile organic compound [hereafter may be referred to as (VOC)] regulation or harmful atmospheric pollutants (HAPs) regulation. Those organic solvents can be removed from cationic electrodeposition paint compositions by desolventing to provide low VOC paint compositions. However, when volatile organic compound (VOC) content of cationic electrodeposition paint compositions is reduced, such problems as deterioration in film thickness retention with time, finished appearance of coating film or electrocoatability on galvanized alloy steel sheet may occur.

Among proposals for solving the problems, for example, JP Sho 63 (1988)-92637A discloses electrodeposition paint containing cationic epoxy resin which is produced by adding organic acid and water to a resin obtained through reaction of (A) a composition comprising diglycidyl ether of at least one kind of polyol and diglycidyl ether of at least one kind of dihydric phenol, with (B) at least one kind of dihydric phenol, to convert the oxysilane groups to cationic groups. Coating film formed of the electrodeposition paint comprising the cationic epoxy resin, however, shows insufficient corrosion resistance.

JP 2003-221547A discloses cationic electrodeposition paint containing as the base resin xylene-formaldehyde resin-modified, amino group-containing epoxy resin formed through reaction of an epoxy resin having epoxy equivalent of 180-2,500 with xylene-formaldehyde resin and amino group-containing compound. The cationic electrodeposition paint containing the xylene-formaldehyde resin-modified, amino group-containing epoxy resin alone as the base resin, however, shows problems in film thickness retention when its VOC content is reduced. Furthermore, because the xylene-formaldehyde resin-modified, amino group-containing epoxy resin has insufficient water dispersibility, addition of a large amount of neutralizer is necessary to secure water dispersibility, which causes defects in finished appearance and electrocoatability on galvanized alloy steel sheet.

JP Hei 8 (1996)-245750A discloses cationic electrodeposition paint containing an epoxy resin (A) produced from diglycidyl ether of polyether polyol, which has an average epoxy equivalent of 350-5,000, or an epoxy resin (B) produced from diglycidyl ether of partially capped polyether polyol, which has an average epoxy equivalent of 300-5,000. However, the coating film formed of the cationic electrodeposition paint containing the resin as described in the patent publication has insufficient corrosion resistance.

JP 2001-3005A discloses that an electrodeposition paint containing less VOC and excelling in film-forming property, electrocoatability of galvanized alloy steel sheet and corrosion resistance can be obtained by blending alkylene-type polyether polyol such as polymethylene glycol, polyethylene glycol, polypropylene glycol or polybutylene glycol, or polyether polyol such as bisphenol alone or aromatic ring-containing polyether polyol obtained through reaction of bisphenol with glycol.

Also JP 2006-274234A discloses that an electrodeposition paint containing little volatile organic solvent (low VOC) which is free from pinhole occurrence when electrocoated on rust-preventive steel sheet and excels in corrosion resistance and paint stability can be obtained by blending specific polyether compound having a molecular weight not more than 1,000.

When a large amount of the polyether polyols as disclosed in JP 2001-3005A or the specific compound having a molecular weight not more than 1,000 as disclosed in JP 2006-274234A are added to electrodeposition paint, however, corrosion resistance of formed coating film may drop, or when mechanical load is exerted on the electrocoating bath over a prolonged period, there is a possibility that the paint stability may be reduced.

DISCLOSURE OF THE INVENTION

The object of the present invention is to provide a cationic electrodeposition paint which, even with reduced volatile organic compound (VOC) content, excels in film thickness retention, finished appearance, electrocoatability of galvanized alloy steel sheet and can form coating film having high corrosion resistance.

We have engaged in concentrative studies to now discover that the above object could be accomplished by the use of specific amino group-containing modified epoxy resin (A), xylene-formaldehyde resin-modified, amino group-containing epoxy resin (B) and blocked polyisocyanate curing agent (C), and by blending these at specific ratios to form cationic electrodeposition paint. The present invention was whereupon completed.

Thus, the present invention provides a cationic electrodeposition paint composition characterized by comprising (A) an amino group-containing modified epoxy resin which is obtained by reacting a modified epoxy resin (A1) with an amino group-containing compound (A2), the modified epoxy resin (A1) being obtained by reacting a diepoxy compound (A1) selected from the group consisting of the diepoxy compounds (A-11) represented by a general formula (1):

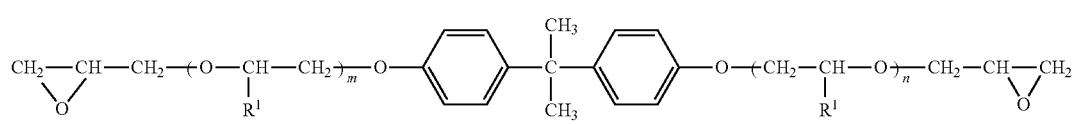

[in which m or n $R^1$s may be the same or different and each stands for hydrogen atom or $C_{1-6}$ alkyl group; m and n each is 0 or an integer, and m+n is 1-20]

and the diepoxy compounds (a-12) represented by a general formula (2):

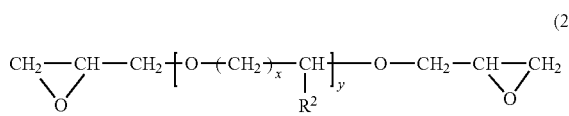

[in which y $R^2$s may be the same or different and each stands for hydrogen atom or $C_{1-6}$ alkyl group; x is an integer of 1-9, and y is an integer of 1-50]

with epoxy resin (a2) having an epoxy equivalent of 170-500 and bisphenol compound (a3);

(B) a xylene-formaldehyde resin-modified, amino group-containing epoxy resin which is obtained by reacting an epoxy resin (B1) having an epoxy equivalent of 180-2,500, with xylene-formaldehyde resin (b2) having phenolic hydroxyl groups and amino group-containing compound (b3); and (C) a blocked polyisocyanate compound,
and containing, based on the total solid mass of above components (A), (B) and (C), 5-60 mass % of the component (A), 5-60 mass % of the component (B) and 10-40 mass % of the component (C).

The cationic electrodeposition paint composition of the present invention contains the amino group-containing modified epoxy resin (A) excelling in water dispersibility as a resin component, and exhibits excellent paint stability such as, for example, filtration applicability through ultrafiltration (UF) membrane or filterability through precision filtering machine.

The cationic electrodeposition paint composition of the present invention also contains both of the specific amino group-containing modified epoxy resin (A) and xylene-formaldehyde resin-modified amino group-containing epoxy resin (B) as the resin component, and excels in corrosion resistance and electrocoatability on galvanized alloy steel sheet. Still in addition, even when the content of volatile organic compound in the cationic electrodeposition paint is reduced, it achieves conspicuous effects such as excellent film thickness retention, finished appearance, electrocoatability on galvanized alloy steel sheet and corrosion resistance.

Hereinafter the cationic electrodeposition paint composition is explained in further details.

Amino Group-Containing Modified Epoxy Resin (A):

The amino group-containing modified epoxy resin (A) which is used as one of the resin components of cationic electrodeposition paint composition of the present invention can be obtained by reacting a modified epoxy resin (A1), which is obtained by reacting a diepoxy compound (a1) selected from the group consisting of the compounds (a11) of the foregoing formula (1) and compound (a12) of the foregoing formula (2), epoxy resin (a2) having an epoxy equivalent of 170-500; and bisphenol compound (a3), with an amino group-containing compound (A2).

Diepoxy Compound (a1):

Those diepoxy compounds (a11) are the compounds represented by the formula (1):

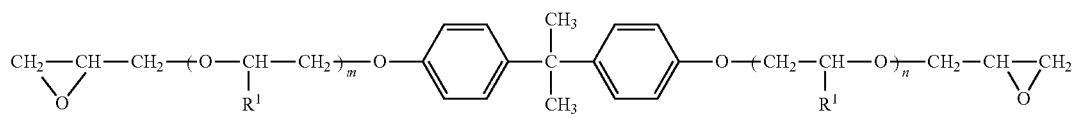

[in which m or n $R^1$s may be the same or different and each stands for hydrogen atom or $C_{1-6}$, preferably $C_{1-2}$, alkyl group, $R^1$ being preferably hydrogen or methyl, m and n each is 0 or an integer, preferably an integer of 1-10; and m+n is 1-20, preferably 2-15]

which can be produced, for example, by adding alkylene oxide of a formula (3):

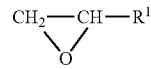

[in which $R^1$ has the previously given definition]
to bisphenol A to form a hydroxyl-terminated polyether compound and reacting the same with epihalohydrin for diepoxidation.

As the alkylene oxide of the formula (3), for example, $C_{2-8}$, preferably $C_{2-4}$, alkylene oxides such as ethylene oxide, propylene oxide, butylene oxide and the like can be named, ethylene oxide (the compound of the formula (3) in which $R^1$ is hydrogen) and propylene oxide (the compound of the formula (3) in which $R^1$ is methyl) being preferred.

Those diepoxy compounds (a12) are represented by the formula (2):

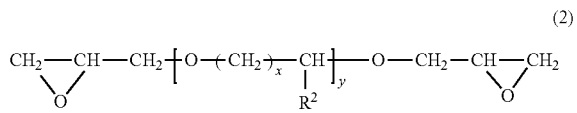

(2)

[in the formula, y $R^2$s may be the same or different and each stands for hydrogen atom or $C_{1-6}$, preferably $C_{1-2}$, alkyl group, in particular, $R^2$ is hydrogen or methyl; x is an integer of 1-9, preferably 1-6, and y is an integer of 1-50, preferably 1-20]

which can be produced, for example, either by ring-opening polymerizing alkylene oxide of the formula (3) in which $R^1$ is substituted with $R^2$, using alkylene glycol as the initiator, and diepoxidizing the resulting hydroxyl-terminated polyalkylene oxide by reacting epihalohydrin therewith; or by reacting the polyether diol obtained through dehydrative condensation of alkylene glycol of a formula (4)

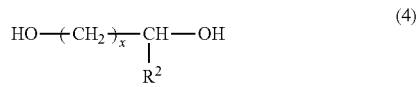

(4)

[in which $R^2$ and x have the previously given definitions] or of at least two molecules of the alkylene glycol, with epihalohydrin for diepoxidation.

As alkylene glycol of the formula (4), for example, $C_{2-10}$, preferably $C_{2-6}$, alkylene glycols such as ethylene glycol, propylene glycol, trimethylene glycol, 1,4-butanediol, 1,3-butanediol, 1,5-pentanediol, 1,6-hexanediol, 1,8-octanediol and the like can be named.

Specific examples of the diepoxy compounds (a11) of the formula (1) or the diepoxy compounds (a12) of the formula (2), which are commercially available, include DENACOL EX-850, DENACOL EX-821, DENACOL EX-830, DENACOL EX-841, DENACOL EX-861, DENACOL EX-941, DENACOL EX-920 and DENACOL EX-931 (tradename, Nagase Chemtex Corporation); Glyciale PP-300P and Glyciale BPP-350 (tradename, Sanyo Chemical Industries, Ltd.).

It is also possible to use (a11) and (a12) each alone or in combination, as the diepoxy compound (a1).

Epoxy Resin (a2):

The epoxy resin (a2) used for preparation of the modified epoxy resin (A1) is a compound containing at least two epoxy groups per molecule, which has a number-average molecular weight within a range of generally 340-1,500, preferably 340-1,000, and an epoxy equivalent within a range of generally 170-500, preferably 170-400. As the epoxy resin (a2), particularly those prepared by reaction of polyphenol compound with epihalohydrin, for example, epichlorohydrin, are preferred.

In the present specification, "number-average molecular weight" is determined following the method prescribed by JIS K 0124-83, from the chromatogram obtained with RI refractometer using, as separation columns, four columns of TSKgel G4000HXL, TSKgel G3000HXL, TSKgel G2500HXL and TSKgel G2000HXL tradename, Tosoh Corporation), and tetrahydrofuran for GPC as the eluent, at the temperature of 40° C. and a flow rate of 1.0 ml/min.; and calibration curve of standard polystyrene.

Examples of the polyphenol compounds useful for the production of epoxy resin (a2) include bis(4-hydroxyphenyl)-2,2-propane [bisphenol A], bis(4-hydroxyphenyl)methane [bisphenol F], bis(4-hydroxycyclohexyl)methane [hydrogenated bisphenol F], 2,2-bis(4-hydroxycyclohexyl)propane [hydrogenated bisphenol A] 4,4'-dihydroxybenzophenone, bis(4-hydroxyphenyl)-1,1-ethane, bis(4-hydroxyphenyl)-1,1-isobutane, bis(4-hydroxy-2- or -3-tert-butylphenyl)-2,2-propane, bis(2-hydroxynaphthyl)methane, tetra(4-hydroxyphenyl)-1,1,2,2-ethane, 4,4'-dihydroxydiphenylsulfone, phenol novolak, cresol novolak and the like.

Also as the epoxy resin obtained through the reaction of such polyphenol compound with epichlorohydrin, particularly those derived from bisphenol A and represented by the formula (5) are preferred:

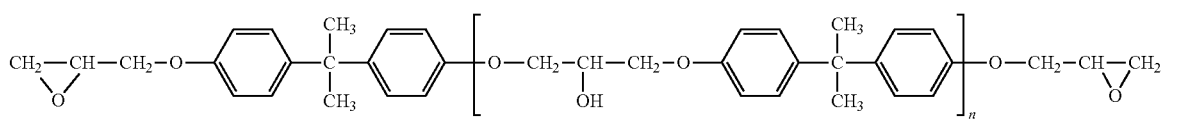

(5)

[in the formula, n is 0-2].

As such epoxy resins which are commercially available, for example, those sold under the tradenames of jER828 EL and jER1001 by Japan Epoxy Resin Co., Ltd. can be named.

Bisphenol Compound (a3):

Bisphenol compound (a3) include the compounds represented by a general formula (6):

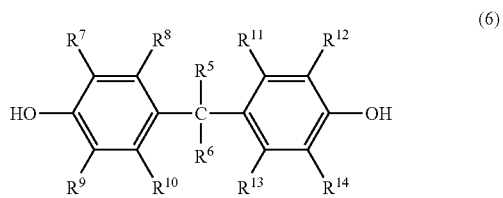

(6)

[in the formula, $R^5$ and $R^6$ each stands for hydrogen atom or $C_{1-6}$ alkyl group, preferably hydrogen atom or $C_{1-2}$ alkyl group; and $R^7$, $R^8$, $R^9$, $R^{10}$, $R^{11}$, $R^{12}$, $R^{13}$ and $R^{14}$ each stands for hydrogen atom or $C_{1-6}$ alkyl group, preferably hydrogen atom]

specific examples of which include bis(4-hydroxyphenyl)-2,2-propane [bisphenol A], bis(4-hydroxyphenyl)methane [bisphenol F] and the like.

Modified Epoxy Resin (A1):

Modified epoxy resin (A1) can be normally produced by reacting above-described diepoxy compound (a1), epoxy resin (a2) and bisphenol compound (a3), suitably in the presence of a catalyst for the reaction such as tertiary amine, e.g., dimethylbenzylamine, tributylamine and the like, or quaternary ammonium salt, e.g., tetraethylammonium bromide, tetrabutylammonium bromide and the like, at temperatures of about 80-about 200° C., preferably about 90-about 180° C., for around 1-6 hours, preferably around 1-5 hours.

In the above reaction, a minor amount of secondary amine such as diethylamine, dibutylamine, diethanolamine, dipropanolamine, methylethanolamine and the like may be used as the reaction catalyst. These secondary amines react with epoxy groups of the epoxy resin (a2) to form tertiary amines which act as the reaction catalyst.

In the occasion of preparing the modified epoxy resin (A1), the diepoxy compound (a1), epoxy resin (a2) and bisphenol compound (a3) can be reacted by any of the order as follows: (i) mixing all of the diepoxy compound (a1), epoxy resin (a2) and bisphenol compound (a3) and allowing them to react; (ii) first reacting the diepoxy compound (a1) with bisphenol compound (a3) and then mixing the resulting reaction product with the epoxy resin (a2) to cause their reaction; or (iii) first reacting the epoxy resin (a2) with bisphenol compound (a3) and mixing the resulting reaction product with the diepoxy compound (a1) to cause their reaction. The progress of such reactions can be traced by epoxy value.

The use ratio of the diepoxy compound (a1), epoxy resin (a2) and bisphenol compound (a3) based on the total solid mass of these three components can be as follows: diepoxy compound (a1), within a range of normally 1-35 mass %, preferably 2-30 mass %, inter alia 3-25 mass %; epoxy resin (a2), within a range of normally 10-80 mass %, preferably 15-75 mass %, inter alia, 20-70 mass %; and bisphenol compound (a3), within a range of normally 10-60 mass %, preferably 15-50 mass %, inter alia, 17-47 mass %, whereby cationic electrodeposition paint excelling in film thickness retention, finished appearance, electrocoatability on galvanized alloy steel sheet and, furthermore, corrosion resistance can be obtained regardless of the reduction of volatile organic compound in the cationic electrodeposition paint.

The above reaction can be optionally carried out in solvent. Examples of useful solvent include hydrocarbon solvents such as toluene, xylene, cyclohexane, n-hexane and the like; ester solvents such as methyl acetate, ethyl acetate, butyl acetate and the like; ketone solvents such as acetone, methyl ethyl ketone, methyl isobutyl ketone, methyl amyl ketone and the like; amide solvents such as dimethylformamide, dimethylacetamide and the like; alcohol solvents such as methanol, ethanol, n-propanol, iso-propanol and the like; aromatic alkyl alcohols such as phenylcarbinol, methylphenylcarbinol and the like; ether alcoholic compounds such as ethylene glycol monobutyl ether, diethylene glycol monoethyl ether and the like; and mixtures of the foregoing.

Thus obtained modified epoxy resin (A1) can have an epoxy equivalent within a range of generally 500-3,000, preferably 600-2,500, inter alia, 600-2,000.

Amino Group-Containing Compound (A2):

The amino group-containing compound (A2) to be reacted with the modified epoxy resin (A1) according to the present invention is a cationic property-imparting component to introduce amino groups into the modified epoxy resin (A1) for cationizing the modified epoxy resin (A1), and contains an amino group containing at least one active hydrogen which reacts with epoxy group.

Examples of amino group-containing compound (A2) used for such purpose include mono- or di-alkylamines such as monomethylamine, dimethylamine, monoethylamine, diethylamine, monoisopropylamine, diisopropylamine, monobutylamine, dibutylamine and the like; alkanolamines such as monoethanolamine, diethanolamine, mono(2-hydroxypropyl)amine, di(2-hydroxypropyl)-amine, monomethylaminoethanol, monoethylaminoethanol and the like; alkylenepolyamines such as ethylenediamine, propylenediamine, butylenediamine, hexamethylenediamine, tetraethylenepentamine, pentaethylenehexamine, diethylaminopropylamine, diethylenetriamine, triethylenetetramine and the like; alkyleneimines such as ethyleneimine, propyleneimine and the like; and cyclic amines such as piperazine, morpholine, pyrazine and the like. Amines obtained by ketiminating primary amines can also be used concurrently with these named above.

Amino group-containing modified epoxy resin (A) which is used in the cationic electrodeposition paint compositions of the present invention can be produced by addition reaction of amino group-containing compound (A2) to above-described modified epoxy resin (A1).

The use ratio of the components (A1) and (A2) in the addition reaction is not strictly limited but can be suitably changed according to the intended utility or the like of the electrodeposition paint composition of the present invention. Whereas, based on the total solid mass of the modified epoxy resin (A1) and amino group-containing compound (A2) that are used for preparation of the amino group-containing modified epoxy resin (A), the modified epoxy resin (A1) can be generally within a range of 65-95 mass %, preferably 70-94 mass %, inter alia, 75-94 mass %; and the amino group-containing compound (A2), generally within a range of 5-35 mass %, preferably 6-30 mass %, inter alia, 6-25 mass %.

The addition reaction can be carried out normally in an adequate solvent, at temperatures ranging about 80-about 170° C., preferably about 90-about 150° C., for around 1-6 hours, preferably around 1-5 hours.

As the solvent for the reaction, for example, hydrocarbon solvents such as toluene, xylene, cyclohexane, n-hexane and the like; ester solvents such as methyl acetate, ethyl acetate, butyl acetate and the like; ketone solvents such as acetone, methyl ethyl ketone, methyl isobutyl ketone, methyl amyl ketone and the like; amide solvents such as dimethylformamide, dimethylacetamide and the like; alcohol solvents such as methanol, ethanol, n-propanol, iso-propanol and the like; aromatic alkyl alcohols such as phenylcarbinol, methylphenylcarbinol and the like; ether alcoholic compounds such as ethylene glycol monobutyl ether, diethylene glycol monoethyl ether and the like; and mixtures of the foregoing can be used.

Xylene-Formaldehyde Resin-Modified, Amino Group-Containing Epoxy Resin (B):

Xylene-formaldehyde resin-modified, amino group-containing epoxy resin (B) is a resin obtainable through reaction of an epoxy resin (b1) having an epoxy equivalent of 180-2,500 with a xylene-formaldehyde resin (b2) having phenolic hydroxyl groups and an amino group-containing compound (b3).

Epoxy Resin (b1):

As the epoxy resin (b1) which is used as a starting material in the preparation of xylene-formaldehyde resin-modified, amino group-containing epoxy resin (B), such an epoxy resin obtained by reaction of polyphenol compound with epihalohydrin, e.g., epichlorohydrin, is particularly preferred from the viewpoint of corrosion resistance of the coating film.

Examples of the polyphenol compounds useful for the production of epoxy resin (b1) include bis(4-hydroxyphenyl)-2,2-propane [bisphenol A], bis(4-hydroxyphenyl)methane [bisphenol F], bis(4-hydroxycyclohexyl)methane [hydrogenated bisphenol F], 2,2-bis(4-hydroxycyclohexyl)propane [hydrogenated bisphenol A] 4,4'-dihydroxybenzophenone, bis(4-hydroxyphenyl)-1,1-ethane, bis(4-hydroxyphenyl)-1,1-isobutane, bis(4-hydroxy-2- or -3-tert-butylphenyl)-2,2-propane, bis(2-hydroxynaphthyl)methane, tetra(4-hydroxyphenyl)-1,1,2,2-ethane, 4,4'-dihydroxydiphenylsulfone, phenol novolak, cresol novolak and the like.

Also as the epoxy resin obtained through the reaction of such polyphenol compound with epichlorohydrin, particularly those derived from bisphenol A and represented by the formula (7) are preferred:

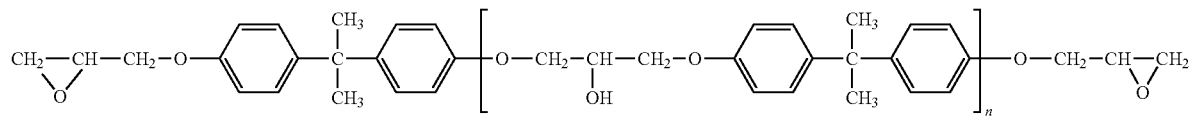

(7)

[in the formula, n is 0-8, preferably 1-7].

The epoxy resins (b1) can have an epoxy equivalent within a range of generally 180-2,500, preferably 200-2,000, inter alia, 400-1,500, and those having a number-average molecular weight of at least 300, in particular, within a range of 400-4,000, inter alia, 800-2,500, are suitable.

As such resins which are commercially available, for example, those sold under the tradenames of jER828EL, jER1002, jER1004 and jER1007 by Japan Epoxy Resin Co., Ltd. can be named.

Xylene-Formaldehyde Resin (b2) Having Phenolic Hydroxyl Groups:

Xylene-formaldehyde resin (b2) has phenolic hydroxyl groups which are reactable with epoxy groups, and is a component contributing to plasticization (modification) of the epoxy resin (b1).

The xylene-formaldehyde resin (b2) having phenolic hydroxyl groups can be prepared, for example, by condensation reaction of xylene with formaldehyde and optionally phenols, in the presence of an acidic catalyst. As the xylene, o-xylene, m-xylene, p-xylene or mixtures thereof can be used, and as the formaldehyde, for example, compounds which generate formaldehyde, such as industrially readily available formaline, paraformaldehyde, trioxane and the like can be used.

The phenols include monohydric or dihydric phenolic compounds having two or three reaction sites, specific examples of which including phenol, cresols (o-cresol, m-cresol, p-cresol), para-octylphenol, nonylphenol, bisphenolpropane, bisphenolmethane, resorcinol, pyrocatechol, hydroquinone, para-tert-butylphenol, bisphenolsulfone, bisphenol ether, para-phenylphenol and the like. These can be used either alone or in combination of two or more. Of these, phenol and cresols are particularly preferred.

As the acidic catalyst to be used in the condensation reaction, for example, sulfuric acid, hydrochloric acid, paratoluenesulfonic acid, oxalic acid and the like can be named, while generally sulfuric acid is particularly preferred. Its adequate use rate is, in terms of concentration in aqueous solution, because normally it is diluted with the water in aqueous formaldehyde solution, within the range of 10-50 mass %.

The condensation reaction can be carried out by heating the system to a temperature at which xylene, phenols, water, formaline and the like which are present in the reaction system reflux, normally about 80-about 100° C. The reaction can be terminated normally in around 2-6 hours.

By the heating reaction of xylene with formaldehyde and, where necessary, phenols in the presence of an acidic catalyst under the above-described conditions, xylene-formaldehyde resin can be obtained. Furthermore, the xylene-formaldehyde resin can also be obtained by reacting advancedly produced xylene-formaldehyde resin optionally with phenols in the presence of an acidic catalyst.

Thus obtained xylene-formaldehyde resin (b2) can have a viscosity within a range of generally 20-50,000 mPa·s (25° C.), preferably 25-30,000 mPa·s (25° C.), inter alia, 30-15,000 mPa·s (25° C.), and preferably a phenolic hydroxyl equivalent within a range of generally 100-50,000, in particular, 150-30,000, inter alia, 200-10,000.

Amino Group-Containing Compound (b3):

The amino group-containing compound (b3) which is reacted with the epoxy resin (b1) is a cationic property-imparting component which is to introduce amino groups into the epoxy resin backbone to cationize the epoxy resin, and amino group-containing compounds similar to those exemplified as to the amino group-containing compounds (A2) which are used in the occasion of preparing the amino group-containing modified epoxy resin (A) can be used.

The xylene-formaldehyde resin-modified, amino group-containing epoxy resin (B) which is used as a resin component in the cationic electrodeposition paint composition of the present invention can be prepared by addition reaction of the xylene-formaldehyde resin (b2) and amino group-containing compound (b3) to the epoxy resin (b1) by the per se known means.

The reaction of xylene-formaldehyde resin (b2) and amino group-containing compound (b3) with epoxy resin (b1) can be carried out by optional order, while preferably the xylene-formaldehyde resin (b2) and amino group-containing compound (b3) are simultaneously reacted with the epoxy resin (b1).

The above addition reaction can be carried out, normally in suitable solvent, at temperatures of about 80-about 170° C., preferably about 90-about 150° C., for around 1-6 hours, preferably about 1-5 hours. Examples of the solvent in the reaction include hydrocarbon solvents such as toluene, xylene, cyclohexane, n-hexane and the like; ester solvents such as methyl acetate, ethyl acetate, butyl acetate and the like; ketone solvents such as acetone, methyl ethyl ketone, methyl isobutyl ketone, methyl amyl ketone and the like; amide solvents such as dimethylformamide, dimethylacetamide and the like; alcohol solvents such as methanol, ethanol, n-propanol, iso-propanol and the like; aromatic alkyl alcohols such as phenylcarbinol, methylphenylcarbinol and the like; ether alcoholic compounds such as ethylene glycol monobutyl ether, diethylene glycol monoethyl ether and the like; and mixtures of the foregoing.

The use ratios of the reaction components in the addition reaction are not strictly limited, but can be suitably varied according to the utility of electrodeposition paint composition of the present invention. Whereas, the following ranges based on the total solid mass of the three components of epoxy resin (b1), xylene-formaldehyde resin (b2) and amino group-containing compound (b3) are adequate:

| | |
|---|---|
| epoxy resin (b1): | generally 50-90 mass %, preferably 50-85 mass %, inter alia, 53-83 mass %; |
| xylene-formaldehyde resin (b2): | generally 5-45 mass %, preferably 6-43 mass %, inter alia, 6-40 mass %; |
| amino group-containing compound (b3): | generally 5-25 mass %, preferably 6-20 mass %, inter alia, 6-18 mass %. |

Blocked Polyisocyanate Curing Agent (C):

Above described amino group-containing modified epoxy resin (A), xylene-formaldehyde resin-modified, amino group-containing epoxy resin (B) are used in combination with blocked polyisocyanate curing agent (C) to prepare thermosetting cationic electrodeposition paint compositions.

Blocked polyisocyanate curing agent (C) is an approximately stoichiometric addition reaction product of a polyisocyanate compound and an isocyanate-blocking agent. As the polyisocyanate compounds to be used for blocked polyisocyanate curing agent (C), those known per se can be used, for example, aromatic, aliphatic or alicyclic polyisocyanate compounds such as tolylene diisocyanate, xylylene diisocyanate, phenylene diisocyanate, diphenylmethane-2,2'-diisocyanate, diphenylmethane-2,4'-diisocyanate, diphenylmethane-4,4'-diisocyanate, crude MDI (polymethylenepolyphenyl isocyanate), bis(isocyanatomethyl)-cyclohexane, tetramethylene diisocyanate, hexamethylene diisocyanate, methylene diisocyanate, isophorone diisocyanate and the like; cyclized polymers or biuret bodies of these polyisocyanate compounds; or combinations of the foregoing.

From the viewpoint of corrosion resistance, aromatic polyisocyanate compounds such as tolylene diisocyanate, xylylene diIsocyanate, phenylene diisocyanate, diphenylmethane-2,4'-diisocyanate, diphenylmethane-4,4'-diisocyanate, crude MDI and the like are particularly preferred.

Isocyanate-blocking agent is to add to and block isocyanate groups of those polyisocyanate compounds. Blocked polyisocyanate compounds produced of the addition are stable at ambient temperatures, but it is desirable that the blocking agent dissociates when heated to baking temperature of coating film (normally about 100-about 200° C.) to regenerate free isocyanate groups.

As the blocking agent used in blocked polyisocyanate curing agent (C), for example, oxime compounds such as methyl ethyl ketoxime, cyclohexanone oxime and the like; phenolic compounds such as phenol, para-t-butylphenol, cresol and the like; aliphatic alcohols such as n-butanol, 2-ethylhexanol and the like; aromatic alkyl alcohols such as phenylcarbinol, methylphenylcarbinol and the like; ether alcoholic compounds such as ethylene glycol monobutyl ether, diethylene glycol monoethyl ether and the like; and lactam compounds such as ε-caprolactam, γ-butyrolactam and the like can be named.

Cationic Electrodeposition Paint Composition:

The blend ratios of the amino group-containing modified epoxy resin (A), xylene-formaldehyde resin-modified, amino group-containing epoxy resin (B) and blocked polyisocyanate curing agent (C) in the cationic electrodeposition paint composition of the present invention can be as follows, based on the total solid mass of the components (A), (B) and (C): the component (A) is within a range of 5-60 mass %, preferably 8-50 mass %, inter alia, 8-40 mass %; the component (B), 5-60 mass %, preferably 10-55 mass %, inter alia, 15-53 mass %; and the component (C), 10-40 mass %, preferably 15-35 mass %, inter alia, 18-35 mass %. By blending the amino group-containing modified epoxy resin (A), xylene-formaldehyde resin-modified, amino group-containing epoxy resin (B) and blocked polyisocyanate curing agent at these ratios, cationic electrodeposition paint compositions of good paint stability which, even when volatile organic compound content in the cationic electrodeposition paint is reduced, shows excellent film thickness retention, finished appearance and electrocoatability on galvanized alloy steel sheet, and furthermore corrosion resistance of the coating film, can be obtained.

In the occasion of formulating a cationic electrodeposition paint composition of the present invention, usually first various additives such as surfactant, surface regulating agent and the like and organic solvent and the like are added, as necessity arises, to the amino group-containing modified epoxy resin (A), xylene-formaldehyde resin-modified, amino group-containing epoxy resin (B) and blocked polyisocyanate crosslinking agent (C), blending thoroughly, and neutralizing the resin (A) and/or (B) with, for example, organic carboxylic acid to make them water-soluble or water-dispersible to form an emulsion. For the neutralization, organic carboxylic acid known per se can be used, in particular, acetic acid, formic acid, lactic acid or mixtures thereof being preferred. Successively, pigment-dispersed paste is added to the emulsion, and the solid resin concentration and viscosity are adjusted with water, to formulate a cationic electrodeposition paint composition of the present invention.

Pigment-dispersed paste is a paste in which pigments such as coloring pigment, rust-preventive pigment, extender and the like are dispersed in pigment-dispersing resin in fine, particulate state in advance. It can be prepared by, for example, subjecting a pigment-dispersing resin, neutralizer and pigments to a dispersing treatment in a dispersing mixer such as ball mill, sand mill, pebble mill or the like.

As the pigment-dispersing resin, those known per se can be used, examples of which including base resin containing hydroxyl groups and cationic groups; high molecular surfactant; tertiary amine type epoxy resin, quaternary ammonium salt type epoxy resin, tertiary sulfonium salt type epoxy resin and the like. Such pigment dispersing resin can be used within a range of normally 1-150 mass parts, in particular, 10-100 mass parts, per 100 mass parts of the sum of pigments and the pigment-dispersing resin.

The pigments are subject to no particular limitation. For example, coloring pigments such as titanium dioxide, Carbon Black, red iron oxide and the like; extenders such as clay, mica, baryta, calcium carbonate, silica and the like; and rust-preventive pigments such as aluminum phosphomolybdate, aluminum tripolyphosphate, zinc oxide (zinc flower) and the like can be blended. Preferred blend ratio of these pigments is normally within a range of 1-100 mass parts, in particular, 5-75 mass parts, inter alia, 10-50 mass parts, per 100 mass parts of the total solid content of the components (A), (B) and (C).

The cationic electrodeposition paint compositions of the present invention can contain bismuth compound, for inhibiting corrosion or prevention of rust of coated articles. Examples of the bismuth compound include bismuth oxide, bismuth hydroxide, basic bismuth carbonate, bismuth nitrate, bismuth silicate and organic acid salts of bismuth (e.g., bismuth lactate).

In the cationic electrodeposition paint compositions of the invention, organic tin compound such as dibutyltin dibenzoate, dioctyltin oxide, dibutyltin oxide and the like may also be blended for improving curability of coating film. Whereas, it is possible to improve curability of the coating film without blending such organic tin compounds, by using adequate amount of, and/or finely dividing, aforesaid rust-preventive pigment such as zinc oxide (zinc flower) and/or bismuth compound.

The cationic electrodeposition paint compositions of the present invention may also contain organic solvent. Examples of the useful organic solvent include: alcoholic solvents such as methyl alcohol (water solubility: freely blendable), ethyl alcohol (water solubility: freely blendable), n-butyl alcohol (water solubility: 7.7 mass %), isopropyl alcohol (water solubility: freely blendable), 2-ethylhexanol (water solubility: 0.07 mass %), benzyl alcohol (water solubility: 3.8 mass %), ethylene glycol (water solubility: freely blendable) and propylene glycol (water solubility, freely blendable); ether solvents such as ethylene glycol monoethyl ether (water solubility: freely blendable), ethylene glycol monobutyl ether (water solubility: freely blendable), ethylene glycol monohexyl ether (water solubility: 0.99 mass %), ethylene glycol mono-2-ethylhexyl ether (water solubility: 0.09 mass %), diethylene glycol monobutyl ether (water solubility: freely blendable), propylene glycol monomethyl ether (water solubility: freely blendable), propylene glycol monophenyl ether (water solubility: insoluble), 3-methyl-3-methoxybutanol (water solubility: freely blendable), diethylene glycol monoethyl ether (water solubility: freely blendable), and diethylene glycol monobutyl ether (water solubility: freely blendable); ketone solvents such as acetone (water solubility: freely blendable), methyl isobutyl ketone (water solubility: 2.0 mass %), cyclohexanone (water solubility: 5.0 mass %), isophorone (water solubility: 1.2 mass %) and acetylacetone (water solubility: 12.5 mass %); ester solvents such as ethylene glycol monoethyl ether acetate (water solubility: 22.9 mass %) and ethylene glycol monobutyl ether acetate (water solubility: 0.9 mass %); and mixtures of the foregoing.

From the viewpoint of enabling to prepare cationic electrodeposition paint compositions which, even when their volatile organic compound content is reduced, excel in film thickness retention, finished appearance and electrocoatability on galvanized alloy steel sheet, it is desirable for the cationic electrodeposition paint compositions of the present invention to contain such an organic solvent (D) which has a solubility parameter of 8-10 and water solubility of at least 95 mass %, at a ratio not more than 1.0 mass %, in particular, not more than 0.5 mass %, based on the total mass of the cationic electrocoating bath prepared of the cationic electrodeposition paint composition of the invention. The total amount of organic solvent contained in the cationic electrocoating bath is, furthermore, preferably not more than 2.0 mass %, in particular, not more than 1.5 mass %.

Specific examples of organic solvent (D) include ethylene glycol monobutyl ether and diethylene glycol monobutyl ether.

Also for achieving reduction in the amount of organic solvent (VOC reduction) as aimed at by the cationic electrodeposition paint compositions of the present invention, it is convenient to desolvent the emulsions. By the desolventing, it becomes possible to control the content of organic solvent (D) having a solubility parameter of 8-10 and water solubility of at least 95 mass %, to be not more than 1.0 mass % based on the total mass of the cationic electrocoating bath; and the total organic solvent content of the cationic electrocoating bath, to be not more than 2.0 mass %.

Coating:

The cationic electrodeposition paint compositions of the present invention can be applied onto any desired coating objects without any particular limitation, so long as they are electrocoatable. Specific examples of the coating object include metallic materials such as cold-rolled steel sheet, galvanized alloy steel sheet, electrogalvanized steel sheet, electrolytic zinc-iron electroplated steel sheet, organic composite plated steel sheet, Al material, Mg material and the like, and those metallic materials which are given such treatment as alkali degreasing where necessary, and thereafter surface treated, e.g., phosphatized or chromated; and car bodies, two-wheeler parts, household appliances and other machines and instruments shaped of these metallic materials.

Cationic electrodeposition paint compositions of the present invention can be applied onto surfaces of desired coating objects as above, by electrocoating. Cationic electrocoating can be generally carried out with an electrocoating bath formed of a cationic electrodeposition paint composition of the present invention which is diluted with deionized water or the like to have a solid concentration of about 5-about 40 mass %, preferably about 8-about 25 mass %, and adjusted of its pH to fall within a range of 5.5-9.0, in particular, 5.8-7.5 under the conditions of normally at the bath temperature of about 15-about 35° C. and applying electric current under exertion of electric pressure of 100-400 V, preferably 150-380 V, with the coating object serving as the cathode. After the electrocoating, normally the coated object is thoroughly washed with filtrate of ultrafiltration (UF filtrate), permeate of reverse osmosis (RO water), industrial water, pure water or the like, to be removed of excessively deposited cationic electrodeposition paint.

While the thickness of the electrocoated film is not particularly limited, it may generally range 5-40 μm, in particular, 12-30 μm, based on the cured coating film. Baking of the coated film can be carried out by heating the electrocoated film with, for example, drying facilities such as electric hot air dryer, gas hot air dryer or the like, normally at about 110-about 200° C., preferably about 140-about 180° C., in terms of the surface temperature of the coated object, normally for about 10-180 minutes, preferably about 20-50 minutes. By the baking, the coating film can be cured to provide an article coated with a cationic electrodeposition paint composition.

EXAMPLES

Hereinafter the invention is explained more specifically, referring to Production Examples, Examples and Comparative Examples, it being understood that the invention is not limited to them only. In those examples, "part" means mass part and "%" means mass %.

Production of Amino Group-Containing Modified Epoxy Resin (A)

Production Example 1

Production Example of Base Resin No. 1

A 2-liter flask equipped with a thermometer, reflux condenser and stirrer was charged with 185 parts of DENACOL EX-821 (note 1), 950 parts of jER828EL (note 4), 456 parts of bisphenol A and 0.8 part of tetrabutylammonium bromide, which were allowed to react at 160° C. until the product's epoxy equivalent reached 800.

Then 359 parts of methyl isobutyl ketone was added, followed by addition of 150 parts of diethanolamine and 127 parts of a ketimination product of methyl isobutyl ketone with diethylenetriamine (purity 84%, in the form of methyl isobutyl ketone solution) and 4 hours' reaction at 120° C. Thus a solution of base resin No. 1, which was an amino group-containing modified epoxy resin, having a solid resin content of 80% was obtained. The base resin No. 1 had an amine value of 69 mgKOH/g and number-average molecular weight of 2,400.

Production Example 2

Production Example of Base Resin No. 2

A 2-liter flask equipped with a thermometer, reflux condenser and stirrer was charged with 471 parts of DENACOL EX-931 (note 2), 950 parts of jER828EL (note 4), 456 parts of bisphenol A and 0.8 part of tetrabutylammonium bromide, which were allowed to react at 160° C. until the epoxy equivalent reached 950.

Then 430 parts of methyl isobutyl ketone was added, followed by addition of 150 parts of diethanolamine and 127 parts of a ketimination product of methyl isobutyl ketone with diethylenetriamine (purity 84%, in the form of methyl isobutyl ketone solution) and 4 hours' reaction at 120° C. Thus a solution of base resin No. 2, which was an amino group-containing modified epoxy resin, having a solid resin content of 80% was obtained. The base resin No. 2 had an amine value of 60 mgKOH/g and number-average molecular weight of 2,500.

Production Example 3

Production Example of Base Resin No. 3

A 2-liter flask equipped with a thermometer, reflux condenser and stirrer was charged with 340 parts of Glyciale BPP-350 (note 3), 950 parts of jER828EL (note 4), 456 parts of bisphenol A and 0.8 part of tetrabutylammonium bromide, which were allowed to react at 160° C. until the epoxy equivalent reached 900.

Then 400 parts of methyl isobutyl ketone was added, followed by addition of 150 parts of diethanolamine and 127 parts of a ketimination product of methyl isobutyl ketone with diethylenetriamine (purity 84%, in the form of methyl isobutyl ketone solution) and 4 hours' reaction at 120° C. Thus a solution of base resin No. 3, which was an amino group-containing modified epoxy resin, having a solid resin content of 80% was obtained. The base resin No. 3 had an amine value of 64 mgKOH/g and number-average molecular weight of 2,500.

The compositions and parameters of the base resin Nos. 1-3 of Production Examples 1-3 are given in Table 1.

TABLE 1

| Base Resin | | | | Production Example 1 No. 1 | Production Example 2 No. 2 | Production Example 3 No. 3 |
|---|---|---|---|---|---|---|
| Composition | (A) | (a1) | DENACOL EX-821 (note 1) | 185 | | |
| | | | DENACOL EX-931 (note 2) | | 471 | |
| | | | GLYCIALE BPP-350 (note 3) | | | 340 |
| | | (a2) | jER828EL (note 4) | 950 | 950 | 950 |
| | | (a3) | bisphenol A | 456 | 456 | 456 |
| | | catalyst | tetrabutylammonium bromide | 0.8 | 0.8 | 0.8 |
| | | solvent | methyl isobutyl ketone | 359 | 430 | 400 |
| | (B) | | diethanolamine | 150 | 150 | 150 |
| | | | ketimination product of methyl isobutyl ketone with diethylenetriamine | 127 | 127 | 127 |
| Parameter | | | amine value (mgKOH/g) | 69 | 60 | 64 |
| | | | number-average molecular weight | 2400 | 2500 | 2500 |

The numbers in the composition columns are by parts.
(note 1) DENACOL EX-821: tradename, Nagase Chemtex Corporation, an epoxy resin (diepoxy compound (a1)), epoxy equivalent 185
(note 2) DENACOL EX-931: tradename, Nagase Chemtex Corporation, an epoxy resin (diepoxy compound (a1)), epoxy equivalent 471
(note 3) GLYCIALE BPP-350: tradename, Sanyo Chemical Co., Ltd., an epoxy resin (diepoxy compound (a1)), epoxy equivalent 340
(note 4) jER828EL: tradename, Japan Epoxy Resin Co., Ltd., an epoxy resin (a2), epoxy equivalent 190, number-average molecular weight 380.

Production of Xylene-Formaldehyde Resin-Modified Amino Group-Containing Epoxy Resin (B)

Production Example 4

Production Example of Xylene-Formaldehyde Resin

A 2-liter separable flask equipped with a thermometer, reflux condenser and stirrer was charged with 480 parts of 50% formaline, 110 parts of phenol, 202 parts of 98% industrial sulfuric acid and 424 parts of meta-xylene, which were reacted at 84-88° C. for 4 hours.

After termination of the reaction, the flask was allowed to stand to separate the resin phase from aqueous sulfuric acid phase. The resin phase was washed with water 3 times, from which unreacted meta-xylene was stripped off under the condition of 20-30 mmHg/120-130° C. for 20 minutes, to provide 480 parts of phenol-modified xylene-formaldehyde resin having a viscosity of 1050 mPa·s (25° C.).

Production Example 5

Production Example of Base Resin No. 4

A flask was charged with 1140 parts of jER828EL (note 4), 456 parts of bisphenol A and 0.2 part of dimethylbenzylamine which were reacted at 130° C. until epoxy equivalent of the reaction product reached 820.

Then 420 parts of methyl isobutyl ketone was added, followed by addition of 300 parts of the xylene formaldehyde resin as obtained in Production Example 4. Further 95 parts of diethanolamine and 127 parts of a ketimination product of methyl isobutyl ketone with diethylenetriamine (purity 84%, in the form of methyl isobutyl ketone solution) were added and reacted at 120° C. for 4 hours, to provide a solution of base resin No. 4, which was an amino group-containing modified epoxy resin having a solid resin content of 80%. The base resin No. 4 had an amine value of 47 mgKOH/g and number-average molecular weight of 2,500.

Production of Blocked Polyisocyanate Curing Agent

Production Example 6

Production Example of Curing Agent

Into a reactor 270 parts of COSMONATE M-200 (tradename, Mitsui Chemicals Inc., crude MDI) and 127 parts of methyl isobutyl ketone were added, and the content's temperature was raised to 70° C. Into the reactor then 236 parts of ethylene glycol monobutyl ether was added dropwise over an hour. The temperature was thereafter raised to 100° C., and while maintaining said temperature, the reaction was continued while sampling with time, until absorption attributable to unreacted isocyanate group became no more observable on infrared absorption spectrum measurement. Thus a curing agent having a solid resin content of 80% was obtained.

Preparation of Emulsion

Production Example 7

Production Example of Emulsion No. 1

An emulsion was obtained by mixing 12.5 parts (solid content 10 parts) of base resin No. 1 as obtained in Production Examples 1, 75 parts (solid content 60 parts) of base resin No. 4 as obtained in Production Example 5, and 37.5 parts (solid content 30 parts) of the curing agent as obtained in Production Example 6, further blending therewith 13 parts of 10% acetic acid, uniformly stirring the same and adding thereto 156 parts of deionized water dropwise over about 15 minutes, under violent stirring.

Then organic solvent extraction ("desolventing") from the resulting emulsion was carried out at 35° C. under reduced pressure (not higher than 50 mmHg) to reduce the methyl isobutyl ketone content of the emulsion to not higher than 1 mass %. Adding 3 parts of ethylene glycol monobutyl ether to the emulsion and adjusting the solid content with deionized water, emulsion No. 1 having a solid content of 34% was obtained.

Production Examples 8-23

Production Examples of Emulsion Nos. 2-17

Emulsion Nos. 2-17 were prepared in the manner same to Production Example 7, except that the compositions as indicated in the following Table 2 were used.

TABLE 2

|  |  | Production Example 7 | Production Example 8 | Production Example 9 | Production Example 10 | Production Example 11 | Production Example 12 | Production Example 13 | Production Example 14 | Production Example 15 | Production Example 16 |
|---|---|---|---|---|---|---|---|---|---|---|---|
| Emulsion | | No. 1 | No. 2 | No. 3 | No. 4 | No. 5 | No. 6 | No. 7 | No. 8 | No. 9 | No. 10 |
| Composition | base resin No. 1 | 12.5 | 25 | 37.5 | 50 | 62.5 | | | 50 | | 87.5 |
| | | (10) | (20) | (30) | (40) | (50) | | | (40) | | (70) |
| | base resin No. 2 | | | | | | 25 | | | 50 | |
| | | | | | | | (20) | | | (40) | |
| | base resin No. 3 | | | | | | | 25 | | | |
| | | | | | | | | (20) | | | |
| | base resin No. 4 | 75 | 62.5 | 50 | 37.5 | 25 | 62.5 | 62.5 | 37.5 | 37.5 | |
| | | (60) | (50) | (40) | (30) | (20) | (50) | (50) | (30) | (30) | |
| | curing agent | 37.5 | 37.5 | 37.5 | 37.5 | 37.5 | 37.5 | 37.5 | 37.5 | 37.5 | 37.5 |
| | | (30) | (30) | (30) | (30) | (30) | (30) | (30) | (30) | (30) | (30) |
| | 10% acetic acid | 13 | 13 | 13 | 13 | 13 | 13 | 13 | 13 | 13 | 13 |
| | deionized water | 156 | 156 | 156 | 156 | 156 | 156 | 156 | 156 | 156 | 156 |
| Emulsion solid content 34% | | 294 (100) | 294 (100) | 294 (100) | 294 (100) | 294 (100) | 294 (100) | 294 (100) | 294 (100) | 294 (100) | 294 (100) |
| Post-addition | ethylene glycol monobutyl ether | 3 | 3 | 3 | 3 | 3 | 3 | 3 | | | 3 |

|  |  | Production Example 17 | Production Example 18 | Production Example 19 | Production Example 20 | Production Example 21 | Production Example 22 | Production Example 23 |
|---|---|---|---|---|---|---|---|---|
| Emulsion | | No. 11 | No. 12 | No. 13 | No. 14 | No. 15 | No. 16 | No. 17 |
| Composition | base resin No. 1 | | | | 5 | 10 | 77.5 | 82.5 |
| | | | | | (4) | (8) | (62) | (66) |
| | base resin No. 2 | 87.5 | | | | | | |
| | | (70) | | | | | | |
| | base resin No. 3 | | 87.5 | | | | | |
| | | | (70) | | | | | |
| | base resin No. 4 | | | 87.5 | 82.5 | 77.5 | 10 | 5 |
| | | | | (70) | (66) | (62) | (8) | (4) |

TABLE 2-continued

|  |  |  |  |  |  |  |  |  |
|---|---|---|---|---|---|---|---|---|
|  | curing agent | 37.5 (30) | 37.5 (30) | 37.5 (30) | 37.5 (30) | 37.5 (30) | 37.5 (30) | 37.5 (30) |
|  | 10% acetic acid | 13 | 13 | 13 | 13 | 13 | 13 | 13 |
|  | deionized water | 156 | 156 | 156 | 156 | 156 | 156 | 156 |
| Emulsion solid content 34% |  | 294 (100) | 294 (100) | 294 (100) | 294 (100) | 294 (100) | 294 (100) | 294 (100) |
| Post-addition | ethylene glycol monobutyl ether | 3 | 3 | 3 | 3 | 3 | 3 | 3 |

The numerals in the parentheses in the composition columns show solid contents.

Production Example 24

Production Example of Pigment-Dispersing Resin

To 1010 parts of jER828EL (note 4), 390 parts of bisphenol A, 240 parts of PLACCEL 212 (tradename, Daicel Chemical Industries, Ltd., polycaprolactonediol, weight-average molecular weight, about 1,250) and 0.2 part of dimethylbenzylamine were added and allowed to react at 130° C. until the epoxy equivalent reached about 1090.

Then 134 parts of dimethylethanolamine and 150 parts of 90% aqueous lactic acid solution were added, and allowed to react at 120° C. for 4 hours. Further the solid content was adjusted by addition of methyl isobutyl ketone, to provide an ammonium salt type resin-derived pigment-dispersing resin having a solid content of 60%. The ammonium salt concentration in his dispersing resin was 0.78 mmol/g.

Production Example 25

Production of Pigment-Dispersed Paste No. 1

A pigment-dispersed paste No. 1 having a solid content of 55% was obtained by mixing 8.3 parts (solid content 5 parts) of the pigment-dispersing resin having a solid content of 60% as obtained in Production Example 24, 14.5 parts of titanium dioxide, 7.0 parts of purified clay, 0.3 part of Carbon Black, 1 part of dioctyltin oxide, 1 part of bismuth hydroxide and 20.3 parts of deionized water, and subjecting the mixture to a dispersing treatment in a ball mill for 20 hours.

Production Example 26

Production Example of Pigment-Dispersed Paste No. 2

A pigment-dispersed paste No. 2 having a solid content of 55% was obtained by mixing 8.3 parts (solid content 5 parts) of the pigment-dispersing resin having a solid content of 60% as obtained in Production Example 24, 14.5 parts of titanium dioxide, 6.0 parts of purified clay, 0.3 part of Carbon Black, 3.0 parts of zinc oxide and 20.3 parts of deionized water, and subjecting the mixture to a dispersing treatment in a ball mill for 20 hours.

Production of Cationic Electrodeposition Paint

Example 1

To 294 parts (solid content 100 parts) of emulsion No. 1 as obtained in Production Example 7, 52.4 parts (solid content 28.8 parts) of the 55% pigment-dispersed paste No. 1 as obtained in Production Example 21 and 297.6 parts of deionized water were added to provide cationic electrodeposition paint No. 1 having a solid content of 20%.

Examples 2-10

Cationic electrodeposition paint Nos. 2-10 were prepared each having the composition as shown in Table 3, in the manner same to Example 1.

TABLE 3

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Cationic electrodeposition paint | | No. 1 | No. 2 | No. 3 | No. 4 | No. 5 | No. 6 | No. 7 | No. 8 | No. 9 | No. 10 |
| Composition | emulsion No. 1 | 294 (100) | | | | | | | | | 294 (100) |
| | emulsion No. 2 | | 294 (100) | | | | | | | | |
| | emulsion No. 3 | | | 294 (100) | | | | | | | |
| | emulsion No. 4 | | | | 294 (100) | | | | | | |
| | emulsion No. 5 | | | | | 294 (100) | | | | | |
| | emulsion No. 6 | | | | | | 294 (100) | | | | |
| | emulsion No. 7 | | | | | | | 294 (100) | | | |
| | emulsion No. 8 | | | | | | | | 294 (100) | | |
| | emulsion No. 9 | | | | | | | | | 294 (100) | |

TABLE 3-continued

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
|  | pigment dispersed paste No. 1 | 52.4 (28.8) | 52.4 (28.8) | 52.4 (28.8) | 52.4 (28.8) | 52.4 (28.8) | 52.4 (28.8) | 52.4 (28.8) | 52.4 (28.8) | 52.4 (28.8) |  |
|  | pigment dispersed paste No. 2 |  |  |  |  |  |  |  |  |  | 52.4 (28.8) |
|  | deionized water | 297.6 | 297.6 | 297.6 | 297.6 | 297.6 | 297.6 | 297.6 | 591.6 | 591.6 | 297.6 |
| Cationic electrodeposition paint solid content 20% |  | 644 (128.8) | 644 (128.8) | 644 (128.8) | 644 (128.8) | 644 (128.8) | 644 (128.8) | 644 (128.8) | 644 (128.8) | 644 (128.8) | 644 (128.8) |

Numerals show blended amounts, and those in the parentheses, solid contents.

Comparative Examples 1-8

Cationic electrodeposition paint Nos. 11-18 were prepared in the manner same to Example 1, using the compositions as shown in Table 4.

TABLE 4

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Cationic electrodeposition paint | | No. 11 | No. 12 | No. 13 | No. 14 | No. 15 | No. 16 | No. 17 | No. 18 |
| Composition | emulsion No. 10 | 294 (100) |  |  |  |  |  |  | 294 (100) |
|  | emulsion No. 11 |  | 294 (100) |  |  |  |  |  |  |
|  | emulsion No. 12 |  |  | 294 (100) |  |  |  |  |  |
|  | emulsion No. 13 |  |  |  | 294 (100) |  |  |  |  |
|  | emulsion No. 14 |  |  |  |  | 294 (100) |  |  |  |
|  | emulsion No. 15 |  |  |  |  |  | 294 (100) |  |  |
|  | emulsion No. 16 |  |  |  |  |  |  | 294 (100) |  |
|  | emulsion No. 17 |  |  |  |  |  |  |  |  |
|  | pigment dispersed paste No. 1 | 52.4 (28.8) | 52.4 (28.8) | 52.4 (28.8) | 52.4 (28.8) | 52.4 (28.8) | 52.4 (28.8) | 52.4 (28.8) |  |
|  | pigment dispersed paste No. 2 |  |  |  |  |  |  |  | 52.4 (28.8) |
|  | Deionized water | 297.6 | 297.6 | 297.6 | 591.6 | 591.6 | 591.6 | 591.6 | 297.6 |
| Cationic electrodeposition paint solid content 20% |  | 644 (128.8) | 644 (128.8) | 644 (128.8) | 644 (128.8) | 644 (128.8) | 644 (128.8) | 644 (128.8) | 644 (128.8) |

The numerals show blended amounts, and those in the parentheses, solid contents.

Preparation of Test Panels

Cold-rolled steel sheet (0.8 mm×150 mm×70 mm) applied with PALBOND #3020 (tradename, Japan Parkerizing Co., phosphatization treating agent), or galvanized alloy steel sheet (0.8 mm×150 mm×70 mm) which had been given the same chemical conversion treatment were used as the coating objects, which were electrocoated with those cationic electrodeposition paints as obtained in the Examples and Comparative Examples, to provide the test panels. Coating performance tests were conducted as to each of the obtained test panels. The results were as shown in the following Tables 5 and 6.

TABLE 5

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Cationic electrodeposition paint |  | No. 1 | No. 2 | No. 3 | No. 4 | No. 5 | No. 6 | No. 7 | No. 8 | No. 9 | No. 10 |
| Organic solvent content of the bath (note 6) | ethylene glycol monobutyl ether | 0.47 | 0.47 | 0.47 | 0.47 | 0.47 | 0.47 | 0.47 | 0.00 | 0.00 | 0.47 |
|  | total content of organic solvent (%) | 1.44 | 1.44 | 1.44 | 1.44 | 1.44 | 1.44 | 1.44 | 0.97 | 0.97 | 1.44 |
| Test result | electrocoatability of galvanized alloy steel sheet (note 7) | ○ | ○ | ○ | ⊙ | ⊙ | ⊙ | ○ | ○ | ○ | ○ |
|  | corrosion resistance (note 8) | ⊙ | ⊙ | ⊙ | ○ | ○ | ○ | ⊙ | ○ | ○ | ⊙ |
|  | exposure resistance (note 9) | ⊙ | ⊙ | ⊙ | ○ | ○ | ○ | ⊙ | ○ | ○ | ⊙ |
|  | finished appearance (note 10) | ○ | ○ | ○ | ○ | ○ | ○ | ○ | ○ | ○ | ○ |
|  | paint stability (water dispersibility) (note 11) | ⊙ | ⊙ | ⊙ | ⊙ | ⊙ | ⊙ | ⊙ | ⊙ | ⊙ | ⊙ |
|  | film thickness retention (note 12) | ○ | ○ | ○ | ⊙ | ⊙ | ○ | ⊙ | ○ | ○ | ○ |

TABLE 6

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Cationic electrodeposition paint |  | No. 11 | No. 12 | No. 13 | No. 14 | No. 15 | No. 16 | No. 17 | No. 18 |
| Organic solvent content of the bath (note 6) | ethylene glycol monobutyl ether | 0.47 | 0.47 | 0.47 | 0.47 | 0.47 | 0.47 | 0.47 | 0.47 |
|  | total content of organic solvent (%) | 1.44 | 1.44 | 1.44 | 1.44 | 1.44 | 1.44 | 1.44 | 1.44 |
| Test result | electrocoatability of galvanized alloy steel sheet (note 7) | ⊙ | ⊙ | ○ | X | Δ | ○ | ⊙ | ⊙ |
|  | corrosion resistance (note 8) | X | X | Δ | ⊙ | ⊙ | ○ | Δ | Δ |
|  | exposure resistance (note 9) | Δ | Δ | Δ | ⊙ | ⊙ | ○ | Δ | Δ |
|  | finished appearance (note 10) | ○ | ○ | ○ | ○ | ○ | ○ | ○ | ○ |
|  | paint stability (water dispersibility) (note 11) | ⊙ | ⊙ | ⊙ | Δ | Δ | ○ | ⊙ | ⊙ |
|  | film thickness retention (note 12) | ○ | ○ | ○ | X | X | X | ○ | ○ |

(Note 6) Organic solvent content of the bath: Ten (10) μl of each cationic electrodeposition paint was sucked into a microsyringe, injected into GC-15A (tradename, Shimadzu Corporation, gas chromatography) and the content was measured under the following conditions: Conditions: column WAX-10 (tradename, Supelco, Inc.) column temp. raised to 200° C. at a rate of 5° C./min. carrier gas He.

(Note 7) Electrocoatability of galvanized alloy steel sheet: Galvanized alloy steel sheet of 0.8 × 150 × 70 mm in size, which had been chemical conversion treated with PALBOND # 3020 (tradename, Japan Perkerizing Co., a phosphatizing agent), was dipped in each electrocoating bath (30° C.) as the cathode, and electrocoated at 210 V with the electricity-applying time suitably adjusted to form 20 μm-thick electrocoated film. Thus obtained electrocoated film was baked and cured at 170° C. for 20 minutes. The number of pinholes within a 10 cm × 10 cm area of the resulting test piece was counted, and the paint's electrocoatability was evaluated according to the following standard: ⊙: No pinhole occurred. ○: One small pinhole occurred, which could be hidden with an intermediate coating film and was of no problem. Δ: Two(2) - 5 pinholes occurred. X: Ten(10) or more pinholes occurred.

(Note 8) Corrosion resistance: Cold-rolled steel sheet of 0.8 × 150 × 70 mm in size, which had been chemical conversion treated with PALBOND # 3020 (tradename, Japan Perkerizing Co., a phosphatizing agent), was dipped in each of the cationic electrocoating bath and electrocoated. Baking the same with a hot air dryer at 170° C. for 20 minutes, test panels with 20 μm-thick cured coating film were obtained. Each coating film was given crosscuts with a cutter knife to the depth reaching the substrate of the test panel and then subjected to 35° C. salt spray test for 840 hours, following JIS Z-2371. According to the rusting and blistering width from the cuts and the coated surface condition of non-cut portion (blistering), corrosion resistance was evaluated according to the following standard: ⊙: Maximum width of rusting or blistering from the cut was not more than 2.0 mm (single side). ○: Maximum width of rusting or blistering from the cut exceeded 2.0 mm but not more than 3.0 mm (single side). Δ: Maximum width of rusting or blistering from the cut exceeded 3.0 mm but not more then 3.5 mm (single side). X: Maximum width of rusting or blistering from the cut exceeded 3.5 mm.

(Note 9) Exposure resistance Test panels which were prepared under the same conditions as those for the corrosion resistance test were spray-coated with WP-300 (tradename, Kansai Paint Co., a water-based intermediate paint) to a cured coating film thickness of 25 μm, and baked with an electric hot air dryer at 140° C. for 30 minutes. Further onto the above intermediate coating film, NEOAMILAC 6000 (tradename, Kansai Paint Co., a top coat paint) was spray coated to a cured film thickness of 35 μm, followed by baking with an electric hot air dryer at 140° C. for 30 minutes to provide test panels for the exposure resistance test. The film coated on the exposure resistance test panels was given crosscuts with a cutter knife to the depth reaching the substrate, and the panels were exposed outdoors in horizontal posture in Chikura Town, Chiba Prefecture (seaside region) for a year. The exposure resistance was evaluated on the following standard, according to the rusting and blistering width from the knife cuts. The maximum rusting or blistering width was: ⊙ less than 2 mm in single side from the cut, ○ at least 2 mm but less than 3 mm in single side from the cut, Δ at least 3 mm but less than 4 mm in single side from the cut, and X at least 4 mm in single side from the cut.

(Note 10) Finished appearance: Cold-rolled steel sheet of 0.8 × 150 × 70 mm in size, which had been chemical conversion treated with PALBOND # 3020 (tradename, Japan Perkerizing Co., a phosphatizing agent), was dipped in each of the cationic electrocoating bath and electrocoated. Thus coated film was baked with a hot air dryer at 170° C. for 20 minutes. The surface roughness, Ra value, of resulting electrocoated film was measured with SURF TEST 301 (tradename, Mitsutoyo Co., a surface roughness meter), and evaluated according to the following standard: ○: Ra value less than 0.25 Δ: Ra value at least 0.25 but less than 0.35 X: Ra value more than 0.35.

(Note 11) Paint stability (water dispersibility): Each of the cationic electrodeposition paints was stirred in a sealed container at 30° C. for 30 days. Thereafter whole of each cationic electrodeposition paint was filtered through 400 mesh filtration net, and the residual quantity (mg/L) on the filtration net was measured, and water dispersibility of each cationic electrodeposition paint was evaluated according to the quantity of the residue as follows: ⊙: less than 5 mg/L, ○: at least 5 mg/L but less than 10 mg/L, Δ: at least 10 mg/L but less than 15 mg/L, and X: at least 15 mg/L.

(Note 12) Film thickness retention: Cold-rolled steel sheet of 0.8 × 150 × 70 mm in size, which had been chemical conversion treated with PALBOND # 3020 (tradename, Japan Perkerizing Co., a phosphatizing agent), was dipped in each of the cationic electrodeposition paints and electrocoated at 250 V for 3 minutes. Thickness (1) of the resulting coating film was measured. Each of the cationic electrodeposition paints was stirred at 30° C. for 10 days in an open container. Thereafter the same cold-rolled steel sheet was dipped in each electrocoating bath of the stirred paint and electrocoated at 250 V for 3 minutes. Thickness (2) of the resulting coating film was measured. The film thickness retention was evaluated according to the following standard: ⊙: The difference between the film thickness (1) and film thickness (2) was less than 1 μm. ○: The difference between the film thickness (1) and film thickness (2) was at least 1 μm but less than 4 μm. Δ: The difference between the film thickness (1) and film thickness (2) was at least 4 μm but less than 7 μm. X: The difference between the film thickness (1) and film thickness (2) was more than 7 μm.

INDUSTRIAL APPLICABILITY

The cationic electrodeposition paint compositions of the present invention can offer coated articles showing excellent electrocoatability on galvanized alloy steel sheet and corrosion resistance, even when the content of volatile organic compound in the cationic electrodeposition paint is reduced.

The invention claimed is:

1. A cationic electrodeposition paint composition comprising:
   (A) an amino group-containing modified epoxy resin, which is obtained by a method consisting of reacting a modified epoxy resin (A1) with an amino group-containing compound (A2), the modified epoxy resin (A1) being obtained by a method consisting of reacting 1-35 mass % of a diepoxy compound (a1) represented by formula (2):

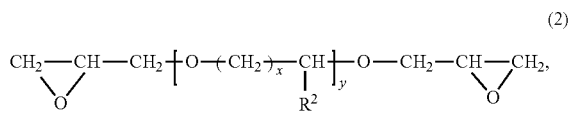

(2)

wherein y $R^2$s are the same or different and each is a hydrogen atom or a methyl group, x is an integer of 1-9, and y is an integer of 1-50,
   with 10-80 mass % of an epoxy resin (a2) having an epoxy equivalent of 170-500 and 10-60 mass % of a bisphenol compound (a3),
   based on the total solid mass of the diepoxy compound (a1), epoxy resin (a2) and bisphenol compound (a3);
   (B) a xylene-formaldehyde resin-modified, amino group-containing epoxy resin, which is obtained by reacting an epoxy resin (b1) having an epoxy equivalent of 180-2,500 with a xylene-formaldehyde resin (b2) having phenolic hydroxyl groups and an amino group-containing compound (b3); and
   (C) a blocked polyisocyanate compound,
   wherein the total solid mass of the above components (A), (B) and (C) is: 5-60 mass % of the component (A), 5-60 mass % of the component (B) and 10-40 mass % of the component (C).

2. The cationic electrodeposition paint composition according to claim 1, wherein the epoxy resin (a2) has a number-average molecular weight within a range of 340-1,500.

3. The cationic electrodeposition paint composition according to claim 1, wherein the bisphenol compound (a3) is selected from the group consisting of bis(4-hydroxyphenyl)-2,2-propane and bis(4-hydroxyphenyl)methane.

4. The cationic electrodeposition paint composition according to claim 1, wherein 65-95 mass % of the modified epoxy resin (A1) is reacted with 5-35 mass % of the amino group-containing compound (A2), based on the total solid mass of the modified epoxy resin (A1) and amino group-containing compound (A2).

5. The cationic electrodeposition paint composition according to claim 1, wherein the epoxy resin (b1) has a number-average molecular weight within a range of 400-4,000.

6. The cationic electrodeposition paint composition according to claim 1, wherein the xylene-formaldehyde resin (b2) has a viscosity within a range of 20-50,000 mPa·s, measured at 25° C.

7. The cationic electrodeposition paint composition according to claim 1, wherein the xylene-formaldehyde resin (b2) has a phenolic hydroxyl group equivalent within a range of 100-50,000.

8. The cationic electrodeposition paint composition according to claim 1, wherein 50-90 mass % of the epoxy resin (b1), 5-45 mass % of the xylene-formaldehyde resin (b2) and 5-25 mass % of the amino group-containing compound (b3), based on the total solid mass of the epoxy resin (b1), xylene-formaldehyde resin (b2) and amino group-containing compound (b3) are reacted.

9. The cationic electrodeposition paint composition according to claim 1, comprising 8-50 mass % of the component (A), 10-55 mass % of the component (B), and 15-35 mass % of the component (C), based on the total solid mass of the components (A), (B) and (C).

10. An article coated with the cationic electrodeposition paint composition according to claim 1.

* * * * *